United States Patent

[11] 3,547,052

| [72] | Inventors | Mariano V. Artiaga<br>Winnetka;<br>Arthur Storrie, Chicago; Andrew Wolf,<br>Deerfield, Ill. |
|---|---|---|
| [21] | Appl. No. | 730,812 |
| [22] | Filed | May 21, 1968 |
| [45] | Patented | Dec. 15, 1970 |
| [73] | Assignee | Kitchens of Sara Lee, Inc.<br>a corporation of Maryland |

[54] SANITARY CLOSED SYSTEM METHOD AND APPARATUS FOR PREPARING AND DEPOSITING VISCOUS FLUIDS SUCH AS WHIPPED CREAM AND THE LIKE
14 Claims, 6 Drawing Figs.

[52] U.S. Cl. .................................................. 107/54,
107/27, 118/25
[51] Int. Cl. .................................................. B05c 1/02
[50] Field of Search.......................................... 107/54,
54.7, 14.2, 14.7, 14.3, 27.1, 27.2; 118/24, 25

[56] References Cited
UNITED STATES PATENTS

| 961,090 | 6/1910 | Anderson..................... | 107/14.2 |
| 1,753,549 | 4/1930 | Cates............................ | 118/24 |
| 2,262,640 | 11/1941 | Greer............................ | 118/24 |
| 3,230,926 | 1/1966 | MacManus.................. | 107/14.2 |

*Primary Examiner*—Laverne D. Geiger
*Assistant Examiner*—Robert I. Smith
*Attorney*—Dressler, Goldsmith, Clement and Gordon ABSTRACT: The present invention is directed to a highly sanitary method and apparatus for expressing and depositing viscous fluids, such as whipped cream and other similar nonflowable confection materials on cakes, pies, and various other bakery goods and dessert foods. The apparatus includes a depositor and accumulator housing or head having a reciprocating piston or plunger therein and a multiplicity of discharge tubes at the nozzle end of the depositor housing. The reciprocating piston is actuated and powered by various means to force the viscous material through the nozzle tubes onto the baked goods positioned below the tips of the discharge tubes.

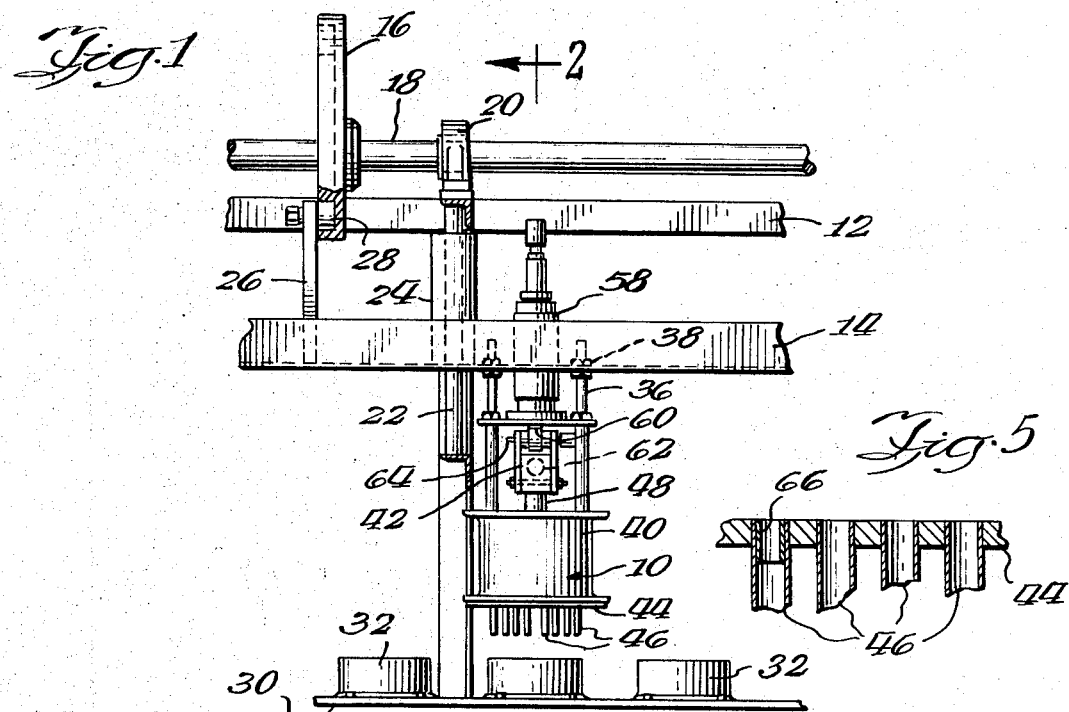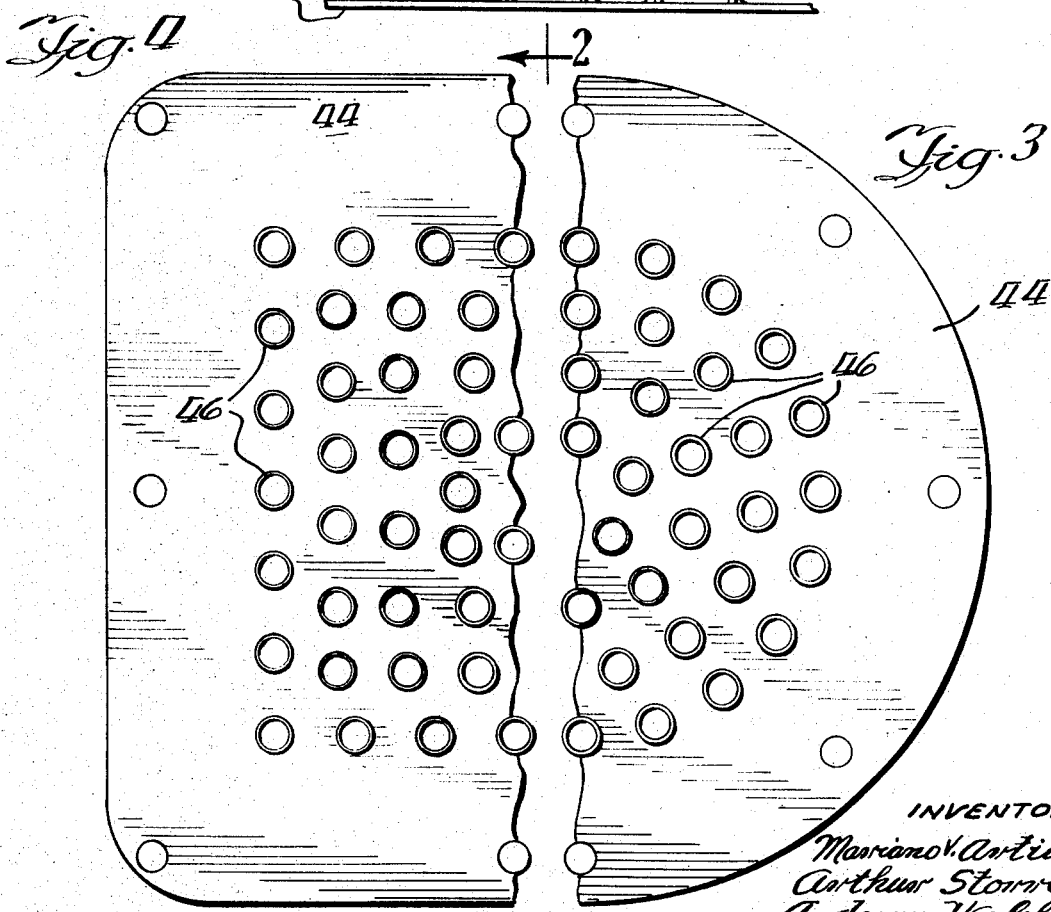

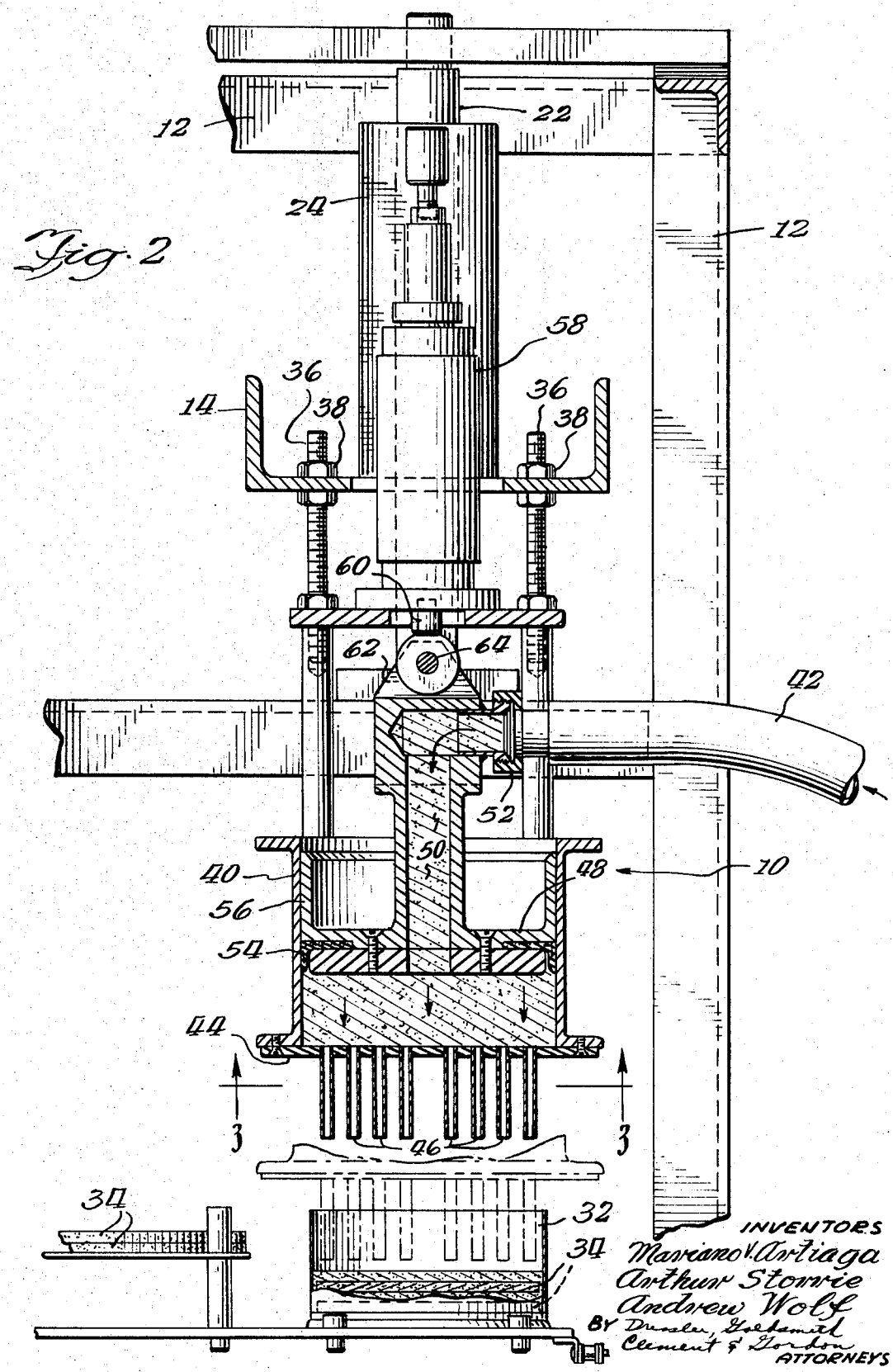

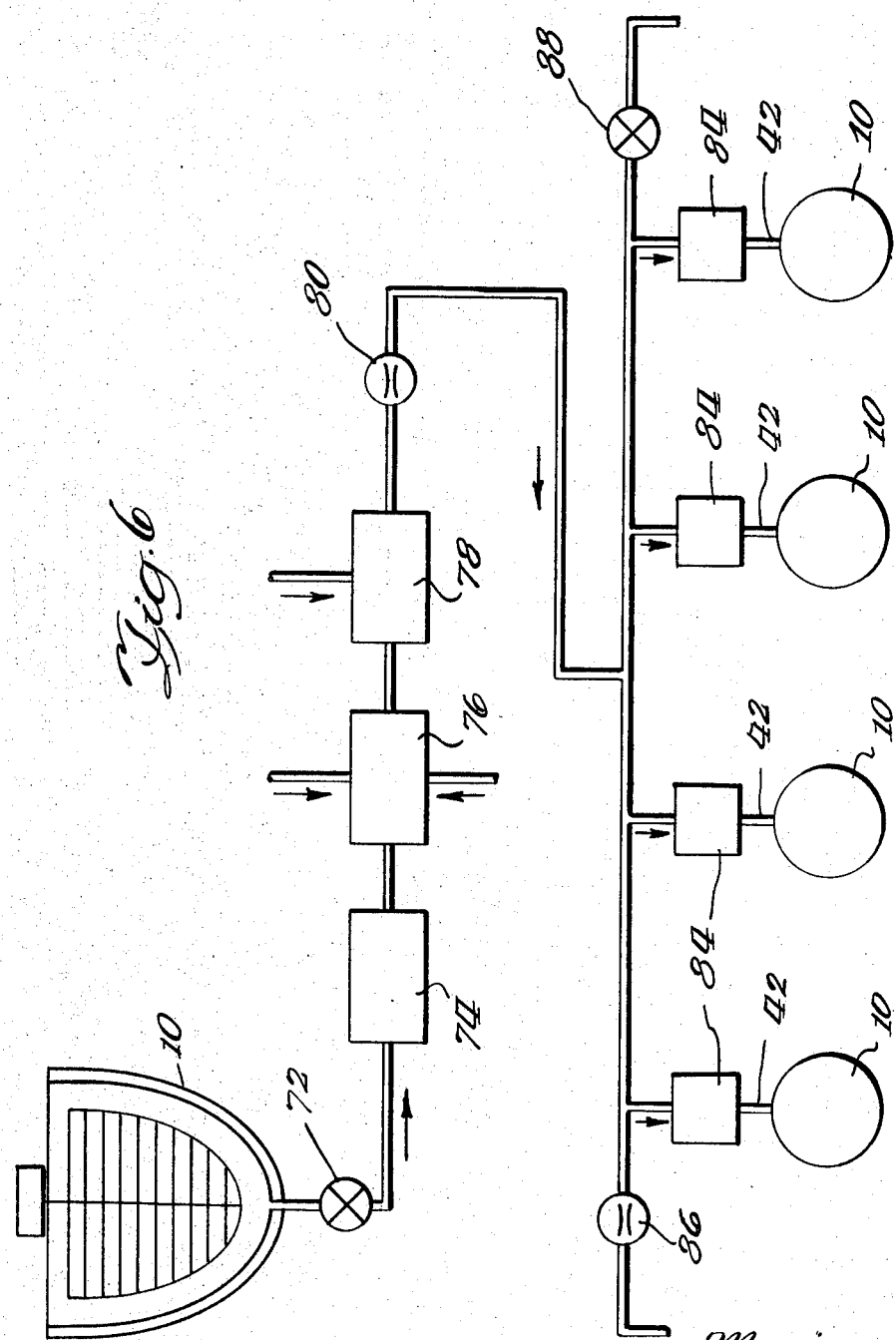

SANITARY CLOSED SYSTEM METHOD AND APPARATUS FOR PREPARING AND DEPOSITING VISCOUS FLUIDS SUCH AS WHIPPED CREAM AND THE LIKE

BACKGROUND OF THE INVENTION

The mechanism and method which comprises this invention can be utilized to produce dessert foods, or baked goods, of the type disclosed in U.S. Pat. application Ser. No. 653,473, filed July 14, 1967, by Harold M. Rich, Berthold L. Weller, and Andrew Wolf. That application is entitled "Method of Packaging Whipped Cream Layer Cake," and is assigned to the assignee of the present invention.

In the past, various types of machines have been developed to deposit nonflowable confection materials and viscous fluids and aerated emulsions, such as whipped cream, butter cream, custards, fudges or the like, on baked goods. However, due to various problems attendant to such machinery, past efforts in the development of machines to mechanically deposit such confections and emulsions on baked goods and dessert foods have not been entirely satisfactory. Accordingly, while there has been substantial demand by the consumer for such dessert foods in the form of ready-to-eat bakery goods, commercial bakeries have answered this demand by either tolerating an undesirably high degree of loss in the form of nonsaleable goods caused by poorly functioning machinery, or by producing such baked goods and dessert foods manually, resulting in an increasingly higher labor cost.

In order to mechanically deposit such confections and aerated emulsions on baked goods efficiently and effectively, machinery must provide a uniform output of the confection material onto the dessert foods, accurate weight control of the material and, particularly, the elimination of any deterioration of the texture and change in characteristics of the confection material. Such deterioration, for example, can be caused by the reduction of air ratio in the emulsion, and the agitation of whipped cream, which when whipped or agitated beyond a certain point will turn to butter. It may also be caused by fluctuations in pressure which rupture cell walls resulting in a substantial change in desired fluffy consistencies.

Accordingly, the present invention provides a mechanically operated sanitary confection depositor and method which will accurately and uniformly convey aerated emulsions and nonflowable confection materials onto baked goods while maintaining the desired texture and cellular makeup of the material. The instant invention utilizes a minimum of working parts and can automatically stop the output of such materials after the required amount has been discharged onto the baked goods. Such an arrangement provides a structure which does not require separately actuated and controlled cutoff mechanisms to insure flow control. Furthermore, when the present invention is utilized with special and delicate aerated emulsions, such as whipped cream, it provides a mechanically operated depositor which will insure the elimination of agitation, or rewhipping, which can result in changing the texture of the material from whipped cream to butter.

Various other advantages will become apparent from the following detailed description taken in conjunction with the attached drawings, in which:

FIG. 1 is a side elevational view of the depositor-accumulator positioned on a layer cake producing machine;

FIG. 2 is an enlarged cross-sectional view of the depositor-accumulator taken on lines 2-2 of FIG. 1;

FIG. 3 is an enlarged fragmentary view of the nozzle portion of the housing taken on lines 3-3 of FIG. 2;

FIG. 4 is an enlarged fragmentary view showing a modified form of the nozzle portion of the housing;

FIG. 5 is an enlarged fragmentary cross-sectional view of the nozzle portion of the depositor housing; and FIG. 6 is a schematic illustration of a system for preparing and handling viscous fluids such as whipped cream to be transmitted to depositor-accumulators.

Referring first to FIGS. 1 and 2, it will be seen that a depositor assembly 10 of this invention is located on a layer cake machine having a frame structure 12 including a horizontal movable member 14 which forms a support member for the depositor assembly 10. The movable support member 14, which is in the form of a flanged channel, is vertically reciprocated by means of a rotary cam 16 secured to a driven shaft 18. The shaft 18 is supported on the frame 12 by bearings and mountings 20 and is driven by any conventional means, such as an electric motor (not shown) located on the machine.

The movable support member 14 is connected to the frame structure 12 by means of a number of vertically disposed rods 22 which are secured to the frame 12 and an equal number of guide bearings 24 which are secured to the channel member 14. The movable support member 14 is coupled to the rotary cam 16 for reciprocating movement by a cam follower assembly 26. Cam follower assembly 26 is secured to channel 14 and has a roller 28 rotatably coupled to its upper end and operatively interconnected with the cam 16, as will be seen in FIG. 1.

The layer cake machine utilized in conjunction with the present invention includes a conveyor 30 which is periodically indexed or advanced by conventional means (not shown) to bring the layer cakes into position below depositor assembly 10. As will be seen in FIGS. 1 and 2, containers 32 are positioned on the conveyors 30 adjacent a stack of individual cake layers 34. As the conveyor is indexed, the container is moved under the depositor assembly 10 to position it so that the confection material can be distributed on the upper surface of the cake layer 34. The layers of the cake 34 are placed in position in the container 32 by either manual means, or an automatic mechanism.

Referring particularly to the depositor assembly 10, it will be seen that the mechanism is supported on movable channel member 14 by means of a number of threaded bolts 36 and associated nuts 38. In the present embodiment, the bolts 36 and the nuts 38 provide a means for adjusting the height of the depositor housing in relation to the container 32 and the cake layers 34 positioned therebelow. When the invention is utilized with a multistation layer cake machine, a number of the depositor head assemblies 10 are positioned at intervals along the path of the conveyor 30. Furthermore, such depositor head assemblies 10 are adjustably secured to the support members in order to fix their position in relation to the then height of the layer cake assembly to which confection is to be applied. As additional layers of cake are placed in the container 32, the distance of the depositor head assembly in relation to the conveyor and to the container is altered. If the present invention was used to decorate the outer surface of other types of baked goods, such as pies, fixed-height cakes or the like, the adjusting mechanism and the reciprocating channel support need not be used.

The particular structure of the depositor assembly 10 includes a housing or cylinder 40 which is connected by various means to a supporting structure. As previously mentioned, in the present instance, the housing 40 is connected to the movable frame member 14 by bolts 36 and 38. However, various other arrangements for supporting the housing 40 could be utilized without departing from the scope of the invention.

The housing 40 serves as the repository or accumulator for the confection material which is transmitted thereto in a manner which will be described. As previously mentioned, the particular embodiment here illustrated is adapted to be utilized with a whipped cream layer cake machine and in the present instance the aerated emulsion known as whipped cream is conveyed to the housing 40 by a suitable metering pump 84. The material passes from the pump through a flexible hose 42 into the housing 40, as will be hereinafter described.

Referring particularly to FIG. 2, it will be seen that secured to the lower end of housing or cylinder 40, and forming one wall of such housing, is a plate 44 having a multiplicity of depending depositing tubes 46 secured thereto and forming discharge ports for the confection material accumulated in and expressed from the depositor assembly. The end wall plate 44 and the discharge tubes 46 form the nozzle end of the depositing assembly 10 and are positioned adjacent the dessert foods, or baked goods, which receive the confection material. It should be noted that the particular configuration of the housing and the plate 44 is not necessarily restricted to a circular or cylindrical form as shown in the instant embodiment. For example, the modified form shown in FIG. 4 illustrates a rectangular housing and nozzle plate. The particular form and arrangement of nozzle tubes 46 as shown in the drawings is not to be considered restrictive, as the invention may be utilized with the discharge tubes 46 being disposed in various patterns. The end portions of the tubes may be open as shown, or have alternate patterns as, for example, a conventional rosette pattern utilized for decorative purposes.

Located at the opposite end of the housing 40 is a means for reducing the volume of the chamber thereby to express the contents, for example, a movable piston or plunger 48. This plunger 48 operates in conjunction with the metering pump 84 and the nozzle end of the housing 40 to receive and convey the whipped cream to the item to be covered.

In FIG. 2, it will be noted that the input flexible hose 42 is sealingly secured as by coupling to an outer end portion of the plunger 48. The plunger 48 has formed therein an intake passage 50 for receipt of the confection material from hose 42 and through which it is transmitted to the internal chamber of the housing 40. The hose 42 is connected to the intake passage 50 by any suitable means, such as fitting 52.

The plunger 48 is also provided with a seal means 54 and a longitudinally extending skirt portion 56. The seal means eliminates the possibility of the material extruding rearwardly past the plunger, out the upper end of the housing 40, and the skirt means 56 provides an extension to the plunger to insure proper alignment of the plunger as it is reciprocated within the housing 40. Seal means 54 in cooperation with plunger 48 sweeps out housing 40 thereby substantially completely cleaning out the housing on each stroke resulting in a very low bacteria content in the products made in accordance with this invention. The entire apparatus is designed to be highly sanitary.

In the present embodiment, the piston, or plunger 48, is actuated within the housing by means of a double-acting pneumatically powered piston and cylinder arrangement 58 having a rod portion 60 coupled to the outwardly extending end portion 62 of the plunger 48 by means of a pin 64. The pneumatic cylinder 58 is properly connected to the various controls for the layer cake machine to insure operation of the plunger 48 in relation to the indexing of the conveyor 30 and the rotary cam 16.

In FIG. 5, there is shown a fragmentary view of a section of the nozzle portion of the depositor assembly 10. It will be seen that one of the multiplicity of tubes 46 which are secured to the housing endwall 44 is provided with a restrictor member 66. Depending on the flowability and consistency of the confection material being handled by the depositor, it is sometimes necessary or desirable to restrict a number of the nozzle tubes 46, particularly those at the center of the plate 44, to insure that the proper amount of confection material is evenly distributed over the entire inner surface of the plate 44. The object of this is to obtain an equal distribution of the material over the surface of the baked goods. Restricting a number of the tubes will insure that each of the tubes 46 receives a similar amount of material as the plunger 48 forces the material from the inner chamber of housing 40. Restricting of the tubes may be accomplished by reducing the internal diameter of the tubes to be restricted, as by, for example, the addition of restrictor members 66 as described.

The operation of the confection material expressing and depositing apparatus is as follows:

The confection material which in the present instance is whipped cream is pumped through the flexible hose 42 by the metering pump 84 which has a predetermined volumetric output. The material moves into the intake port or passage 50 of the plunger 48 and proceeds through the hollow stemmed passage portion of the plunger into the chamber or accumulator formed within the housing or cylinder 40 by the head end portion of the plunger 48, the internal surface of the nozzle plate 44, and the vertically extending portions of the housing 40. This confection material proceeds into this chamber at a fixed rate to accumulate a predetermined amount.

When the baked goods or dessert foods are intermittently indexed into a position under the depositing head assembly, as seen in FIGS. 1 and 2, the cam 16 will be rotated by its power means (not shown), which causes the cam follower assembly 26 and its roller 28 to respond to the motion of the cam and lower the movable frame member 14 and the depositor housing 40 on the guide rods 22 and the associated guide bushings 24. When the lowering cycle is completed, the housing 40 and the nozzle tubes 46 will be positioned as seen in dotted lines in FIG. 2. In this position, the end portions of the nozzle tubes 46 are disposed immediately above the cake layer 34, which has been positioned within the container 32. As soon as this position is reached, the pneumatically powered piston and cylinder assembly 58 will be actuated and the piston rod 60 will move downwardly causing the plunger 48 to force the confection material, that is the whipped cream, through the nozzle tubes 46, onto the upper surface of the cake layer 34. During this operation, the metering pump 84 will be continuing to pump and force the whipped cream emulsion into the housing 40 through the passage 50 and the plunger 48. The rate of output from the metering pump in addition to the predetermined stroke of the plunger 48 will accurately transmit a uniform amount of confection material onto the upper surface of the cake layer 34. As soon as the intermittently operable plunger 48 has reached the extent of travel allowed by the adjusted position of the pneumatically powered piston and cylinder assembly 58, the cycle will reverse, which will retract the plunger 48, causing it to move upwardly and enlarging the internal chamber of the housing 40. It is possible to operate the metering pump 84 intermittently rather than continuously, for example during the accumulation portion of the cycle and not during the discharge portion of the cycle.

As the plunger 48 moves upwardly, a slight vacuum tends to form within the chamber of the cylinder, or housing 40. This reduction of pressure within the cylinder or partial vacuum will stop the flow of confection material from the nozzle tubes 46 and will in fact tend to suck the material in toward the housing chamber. By this means, no additional material will leave the nozzle tubes 46 to cause dripping or the like, on the conveyor or baked goods disposed therebelow. This arrangement provides a relatively simple maintenance-free cutoff means to accurately insure the depositing of a uniform amount of material on the baked goods.

As soon as the plunger 48 is fully retracted, the chamber within the housing 40 is filled again with confection material from the pump. Because the material is not free flowing it will remain within the housing until the system is recycled. It is to be observed that the pressure in the housing is substantially atmospheric. Thus as the pressurized material is brought into the housing its pressure is finally reduced to substantially 0 p.s.i.g.

As previously mentioned and as illustrated in FIG. 5, the nature and the flowability of the material handled by this depositor mechanism may make it necessary to insert some form of restrictor into the internal end portions of the nozzle tubes 46. These restrictors, as shown in FIG. 5 and indicated by the numeral 66, merely minimize the amount of material that can flow at any given moment through the opening into the tube 46. Accordingly, as the confection material is conveyed into the inner chamber of the housing 40 and deposited on the upper surface of the nozzle plate 44, it will tend to flow to the outer regions by the walls of the housing 40. However, due to the position of the passage 50 and the flowability of the material, there may be an additional buildup of material at the center of the plate 44. By means of the restrictor members, when the plunger 48 begins its action against the material, the material will move to the outer periphery of the chamber and an equal amount will flow through the tubes to insure proper distribution thereof.

The particular shape and length of the nozzle tubes 46 are determined by the type of machinery in which the depositor assembly is utilized. For example, in the embodiment shown, the ends of the tubes are circular and of a particular length. As previously mentioned, in a layer cake machine, several of the depositor heads and nozzle assemblies are utilized and are adjusted in accordance with the height of the object which receives the confection material. It is also possible that the length of the tubes can be altered and depending on the particular requirement of the confection materials, the design of the tubes can be alternated. For example, if the depositor is to be used to place a decorative pattern on the upper surface of the bakery goods, various well-known types of nozzle tube ends could be utilized to provide different patterns.

As previously mentioned, one of the specific advantages of the depositing head assembly as shown as described is the assurance that there will be no deterioration of the texture of the confection material. One of the most difficult confection materials to handle for a mechanically operated depositor is whipped cream. Whipped cream comprises a volume of liquid and air in a particular ratio, and reduction of this ratio will change the texture of the whipped emulsion. Furthermore, if the depositor and its various assembly parts actively agitate the emulsion as it is transmitted to the output tubes, the emulsion can very easily change to butter making it completely unusable. In the present construction, the combination of the fixed metering pump and the predetermined rate of travel and amount of travel of the plunger will cause an efficient depositing of whipped cream without altering the ratio of air to liquid, without disturbing the cell structure of the material and without agitating the material to alter the consistency and texture thereof.

A suitable system for preparing and handling viscous fluids and specially suitable for whipped cream and like delicate aerated or partially aerated products and for bringing it to depositors 10, is illustrated in FIG. 6.

In accordance with this invention, a closed system method for preparing and depositing a viscous fluid confection is provided, in which method the fluid confection is not exposed to the atmosphere from the time the ingredients are mixed until the time the mixed ingredients are deposited.

As shown in FIG. 6, a suitable cooled and agitated, jacketed holding tank 70 contains the ingredients for making a confection such as whipped cream. The contained whipping cream is drawn through a valve 72 by a positive displacement pump 74, such as a sanitary gear pump having a pair of cooperating geared impellers. The cream is then pumped through a cooler 76 where it is cooled to a suitable temperature, about 38° F. being a suitable temperature for whipping cream. The whipping cream then passes into a closed mixer chamber such as aerating mixer 78 where it is whipped into whipped cream. A suitable aerating agent is nitrogen, although other inert and sanitary gases may be used alternatively. It has been found that a mixer known as an "Oakes Mixer" manufactured by the E. T. Oakes Corporation having conduit means for introducing whipping cream and an aerating gas is well adapted for use in this system. Mixer 78 is preferably maintained at a pressure of at least 20 and up to about 30 p.s.i.g.

Once mixed, it is very important to handle the viscous fluid, such as whipped cream quite carefully in a closed system. For example, significant fluctuations in pressure will tend to further "whip" the cream, resulting in the formation of butter and in the changing of the texture and consistency of the product. Because the cellular structure of the whipped cream is delicate and because the cells have weak film strengths, large or sudden pressure reductions will tend to rupture the cell walls, thereby substantially and adversely affecting the texture and quality of the whipped cream.

Therefore, once the whipped cream is mixed it is very important to provide means for carefully handling it and for carefully and gradually reducing the pressure acting upon it, i.e., gradually reducing the pressure from 20—30 p.s.i.g. in the mixer to atmospheric where it is deposited, as on a cake layer 34, or on a graham cracker crumb layer to form a pie, or the like.

To this end, it has generally been considered desirable to use a long discharge hose leading from the mixer to the atmosphere and to avoid the use of back pressure regulating valves in which churning, expansion and contraction normally and frequently take place. It has been found, however, that a valve imparting relatively streamline flow characteristics through the valve such as a rubber pinch valve may be used in the line through which the whipped cream passes without adversely affecting its texture and characteristics. A suitable rubber pinch valve is one having a rubber sleeve constituting an effective continuation of the flow line, which sleeve is surrounded by a gas tight housing, between the walls of which housing and sleeve external gas pressure is operable to close, to throttle and to allow full opening of and full flow through the sleeve. Such a pinch valve 80 is positioned downstream of the mixer 78 and is set to maintain a line pressure of about 20 p.s.i.g.

Where the whipped cream is to be directed to a plurality of depositor assemblies 10, it is conveyed through closed conduit means, through the pinch valve 80 into a closed manifold 82 from which manifold it is diverted to one or more depositor stations, each of which station is provided with a metering pump 84 adapted to draw from the manifold the requirements for the associated downstream accumulator-depositor assembly, such as depositor assembly 10.

To assist in regulating the pressure in the whipped cream line and to insure the desired gradual pressure reduction previously mentioned, the manifold is provided with a further pinch valve 86. Valve 86 is desirably maintained at a shutoff pressure of about 10 p.s.i.g., thereby, in cooperation with pinch valve 80, maintaining a manifold pressure of between 10 and 20 p.s.i.g. Additionally a sample drawoff valve 88 may be provided in the manifold for an obvious purpose.

Each depositor assembly 10 includes, as previously described, a variable volume accumulator housing from which mixed ingredients conveyed thereto to fill the same are intermittently expressed by means for intermittently reducing the volume of the accumulator chamber. Although the particular intermittently operable volume reducing means have been described as including a plunger 48 in connection with the illustrated and described presently preferred embodiment, in the method of this invention other intermittently operable volume reducing means such as bellows and diaphragms could be used, for expressing the mixed ingredients through a depositor wall onto a cake layer, into a confection pan or container or the like, which are presented intermittently to the depositor wall for receiving the mixed ingredients. As has been explained the configuration of the openings in the depositor wall or of the associated nozzles, may, as illustrated in FIGS. 4 and 5, assume in outline various shapes, depending upon the desired shape of, such as, the confection pan, or container or cake layer or the like.

When the cream handling and depositing system is properly balanced, the whipped cream is prepared and dispensed through the accumulator-depositors in quantities that will utilize all that is made while maintaining the desired pressures through the system. If, however, one of the plurality of depositors should be inoperative for a time, the back pressure in the system will increase and whipped cream will escape through pinch valve 86 until the quantity of cream and gas introduced into mixer 78 are readjusted. Whipped cream which escapes in this fashion must then be handled manually or, in a fully mechanized operation, will be wasted. This occasional waste has been found preferable to the otherwise attendant fluctuations in pressure which will churn the whipped cream to butter or which will destroy or impair the texture and cell structure of the whipped cream if escape is not permitted. Other malfunctions or changes in the system are also accommodated via the pinch valve 86, without an attendant disturbance in the remainder of the system which would otherwise adversely affect the consistency and texture of the whipped cream.

Where one depositor only is in operation, the pressure at the mixer 78 will be sufficient to supply the depositor and in that instance a metering pump 84 may not be necessary. By properly balancing a system using only two depositors, the pressure at mixer 78 may also be sufficient to avoid the interpositioning of metering pumps 84. It has been found highly desirable, however, where three or more depositors are used, to utilize metering pumps 84 to make certain that each depositor station receives an adequate and measured supply of whipped cream.

While the invention has been described for use with a particular type of mechanism, it will be appreciated that this is by way of example only. It should be understood that while a preferred embodiment of the invention is shown and described to illustrate the invention, modifications and variations of the structure may be employed without departing from the principles and scope of the invention as defined in the appended claims.

We claim:

1. A depositing apparatus comprising means for directing a viscous fluid material thereto, a housing including sidewalls and a plate structure defining a multiplicity of openings to the atmosphere at one end thereof to form an endwall, a plunger engaging said sidewalls disposed within said housing in an opposed relationship to said endwall and defining a passage therethrough in constant flow communication at one end with said directing means and at the other end with a chamber defined between a face of said plunger, the housing sidewalls and the end plate, means for reciprocating the plunger within the housing to move the plunger toward and away from said end wall plate, whereby when the directing means transmits viscous fluid material to the housing such material will pass through the passage in said plunger into said chamber and when the reciprocating means is actuated the plunger will force the material from the chamber through the openings without altering the character and texture of the material.

2. A depositing apparatus comprising means for directing a viscous fluid material thereto, a housing including sidewalls and a plate structure defining a multiplicity of openings to the atmosphere at one end thereof to form an endwall, a plunger engaging said sidewalls disposed within said housing in an opposed relationship to said endwall and defining a passage therethrough in flow communication at one end with said directing means and at the other end with a chamber defined between a face of said plunger, the housing sidewalls and the end plate, means for reciprocating the plunger within the housing to move the plunger toward and away from said endwall plate, whereby when the directing means transmits viscous fluid material to the housing such material will pass through the passage in said plunger into said chamber and when the reciprocating means is actuated the plunger will force the material from the chamber through the openings without altering the character and texture of the material, and in which said plunger sweepingly engages said sidewalls and said passage opens centrally of said face of said plunger and extends into direct flow communication with said directing means, said directing means being sealingly secured to said plunger for reciprocating movement therewith.

3. A depositing apparatus for dressing edible products with a desired predetermined pattern of whipped cream comprising in combination a support, a cylindrical housing secured to said support and having an open end portion, a reciprocating cylindrical plunger assembly disposed within said housing and defining a passage therethrough, means for reciprocating said plunger within said housing, a plate having openings therein and defining with said plunger and housing a chamber for accumulating whipped cream, depending hollow tubes positioned within the plate openings and fixed relative to said plate, means for supplying whipped cream to said chamber through said passage including a flexible hose coupled to the inlet end of the passage in said plunger, whereby a whipped cream supply means transmits whipped cream through the plunger into said chamber and the reciprocating plunger forces the accumulated whipped cream from the chamber through the tubes to the atmosphere without altering its character.

4. The depositing apparatus set forth in claim 3 in which one or more of said tubes are restricted to reduce the flow therethrough to obtain the desired flow rate of whipped cream from said chamber.

5. A mechanism, for depositing a confection like whipped cream on a cake layer, comprising a supporting member, a movable frame member connected to the supporting member, means for reciprocating the movable frame member, a depositor secured to the movable frame member, a conveyor positioned below said depositor and said movable frame member for incremental movement normal thereto, said depositor having a housing including an endwall defining a plurality of openings, a reciprocating plunger within said housing and constructed and arranged to move toward and away from said endwall, said plunger, said endwall and said housing defining an accumulating chamber, means for reciprocating the plunger, means for conveying confection material to the housing, said plunger defining an intake passage interconnecting the means for conveying confection material and said chamber, and means for correlating the movement of said conveyor, depositor and plunger, whereby as the conveyor positions a cake layer beneath the depositor, the movable frame member will lower the depositor and the confection material directed to said chamber will be forced from the chamber by the plunger onto the cake layer without essentially changing the consistency of the confection material.

6. Apparatus for preparing and depositing a fragile viscous aerated material without adversely affecting the texture and characteristics of said material, said apparatus comprising means for aerating a fluid under pressure, means for transmitting said pressurized aerated material under gradually reducing pressure to a depositor assembly, a depositor assembly in flow communication with said transmitting means, a chamber defined by said depositor assembly for receiving pressurized aerated material at one end, for accumulating said material therein and for depositing said material at ambient pressure at the other end, said chamber comprising a sidewall, a perforated end plate at said other end and a plunger face assembly at said one end, said plunger face assembly defining an always open aperture in constant direct flow communication with said transmitting means whereby pressurized aerated material continuously flows from said transmitting means into said accumulating chamber, said plunger face assembly being in sweeping engagement with said sidewall, and means for reciprocating said plunger face assembly toward and away from said perforated end plate.

7. Apparatus for preparing and depositing fragile aerated confections and the like comprising means for aerating a liquid under pressure, conduit means for conveying aerated material under gradually reducing pressure to a depositor, pinch valve means for controlling the pressure in the conduit means intermediate said aerating means and a depositor, a depositor, said depositor defining an accumulating chamber in flow communication with said conduit means and the atmosphere, an apertured reciprocable plunger in said chamber for expressing material accumulated in said chamber to the atmosphere, the aperture defined by said plunger being in constant flow communication with said chamber and with said conduit means.

8. The apparatus of claim 7 in which conduit means lead from said pinch valve means to a manifold feeding at least two depositors, said manifold including a further pinch valve means located in parallel with said depositors, said further pinch valve means being operable to close at a pressure lower than the pressure at which said pinch valve is set to close, thereby to insure a positive pressure in said manifold and at the inlet to each of said depositors.

9. The apparatus of claim 7 in which a metering pump is positioned intermediate said pinch valve means and said depositor in said conduit means to meter the quantity of pressurized aerated material supplied to said accumulating chamber.

10. A continuous closed system method of preparing, conveying and depositing a fragile aerated confection such as whipped cream and the like on a pastry such as a cake layer and the like, the steps comprising aerating a liquid under pressure to form a pressurized expanded aerated confection, conveying said pressurized expanded aerated confection in a closed conduit system under gradually reducing pressure thereby to deliver said pressurized expanded aerated confection under a reduced but superatmospheric pressure to a depositor, gradually filling an accumulator chamber in a depositor with said pressurized expanded aerated confection in which chamber the pressure becomes atmospheric then, expressing said expanded aerated confection from said chamber onto a pastry, whereby the pressure of said pressurized expanded aerated confection is gradually reduced from the time it is aerated until it is expressed and is continuously under superatmospheric pressure from the time it is aerated until it is accumulated in a depositor chamber.

11. In the continuous closed system method of claim 10, further comprising automatically maintaining a maximum elevated pressure for delivery of said pressurized expanded aerated confection to said depositor, which pressure is less than the pressure at which said pressurized expanded aerated confection is aerated.

12. A closed system apparatus for preparing, conveying and depositing a fragile aerated confection such as whipped cream and the like on a pastry such as a cake layer and the like, said apparatus comprising means for aerating a liquid under pressure to form a pressurized expanded aerated confection, conduit means for conveying said pressurized expanded aerated confection under gradually reducing pressure thereby to deliver said pressurized expanded aerated confection under a reduced but superatmospheric pressure to a depositor, a depositor, means for gradually filling an accumulator chamber in said depositor with said pressurized expanded aerated confection in which chamber the pressure becomes atmospheric, and means for expressing said expanded aerated confection from said chamber onto a pastry, whereby the pressure of said pressurized expanded aerated confection is gradually reduced from the time it is aerated in said aerating means until it is expressed and is continuously under superatmospheric pressure from the time it is aerated until it is accumulated in said accumulator chamber.

13. In a closed system for preparing and depositing a viscous fluid confection in which said fluid confection is not exposed to atmospheric pressure from the time the ingredients are mixed until the time it is deposited, comprising a mixing chamber for the confection ingredients in which said ingredients are mixed, conduit means for conveying said mixed ingredients to a variable volume accumulator, a variable volume accumulator for receiving said mixed ingredients, means for intermittently reducing the volume of said accumulator to express said mixed ingredients through a depositor wall of said accumulator, and means for presenting containers to said depositor wall to receive said mixed ingredients.

14. In the system of claim 13 in which said depositor wall includes a plurality of vertically positioned nozzles overlying said means for presenting containers and through which said mixed ingredients are expressed when said means for intermittently reducing volume of said accumulator is operated.